United States Patent

[11] 3,559,743

| [72] | Inventor | Paul F. Hastings |
| | | 5509 N. Market St., Spokane, Wash. 99207 |
| [21] | Appl. No. | 696,351 |
| [22] | Filed | Jan. 8, 1968 |
| [45] | Patented | Feb. 2, 1971 |

[54] HANDLE HEIGHT ADJUSTMENT FOR CULTIVATORS
2 Claims, 4 Drawing Figs.

[52] U.S. Cl. .................................................. 172/43, 172/358
[51] Int. Cl. ................................................... A01b 33/00
[50] Field of Search .......................................... 172/21, 43, 78, 80, 259, 318, 323, 395, 424, 42, 358; 280/43, 43.1; 180/19; 292/272, 305, 306, 220, 210; 248/410, 411; 16/19, 31A, 32, 35, 35D; 182/14, 15, 39, 62.5; 287/58, 58C.T

[56] References Cited
UNITED STATES PATENTS

| 469,168 | 2/1892 | Nicholson | 280/43 |
| 1,219,150 | 3/1917 | Raney et al. | 280/43 |
| 1,600,850 | 9/1926 | Segalini | 292/228 |
| 1,905,983 | 4/1933 | Harder | 292/228 |
| 1,955,969 | 4/1934 | Marzolf | 287/58 |
| 2,213,561 | 9/1940 | Cuneo | 292/228X |
| 2,923,565 | 2/1960 | Klebe | 287/58 |

FOREIGN PATENTS

| 512,817 | 10/1920 | France | 172/43 |

Primary Examiner—Robert E. Pulfrey
Assistant Examiner—James W. Peterson
Attorney—Alex Lagaard ABSTRACT: A handle height adjustment for attachment to a garden cultivator having a frame, a tiller and a motor driving said tiller, both mounted on said frame and a handle disposed above said frame, said Handle Height Adjustment comprising a pair of wheels mounted on an axle having an upright attached thereto, together with a support mounted on the cultivator frame and having guide means supporting said upright for vertical sliding movement. A cam is mounted on a shaft pivoted to the support. This shaft has attached to it a spring arm and a spring acting between said arm and said case urges the cam into engagement with the upright to hold the cam in an adjusted position. A foot operated release arm fixed to the shaft serves to hold the spring in cam releasing position to permit adjustment of the upright to vary the height of the handle above the ground and safety locking means retains the cam in engaged positions relative to the upright.

PATENTED FEB 2 1971    3,559,743
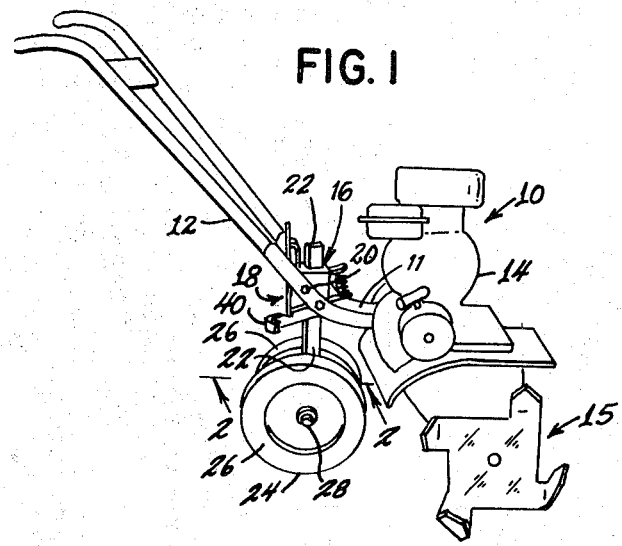
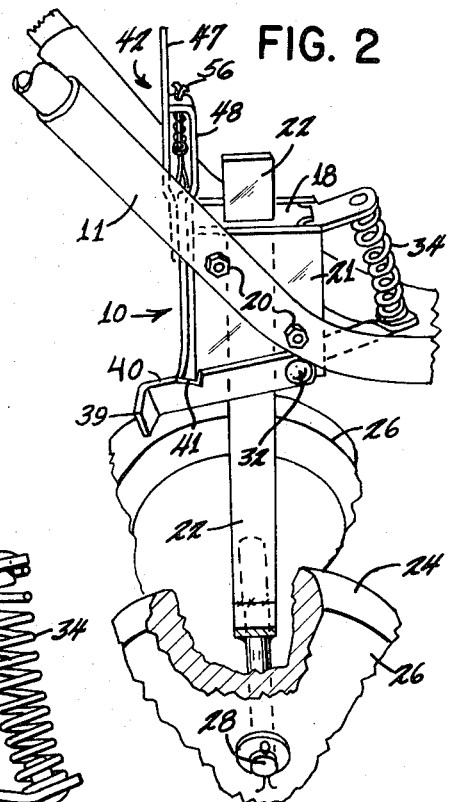
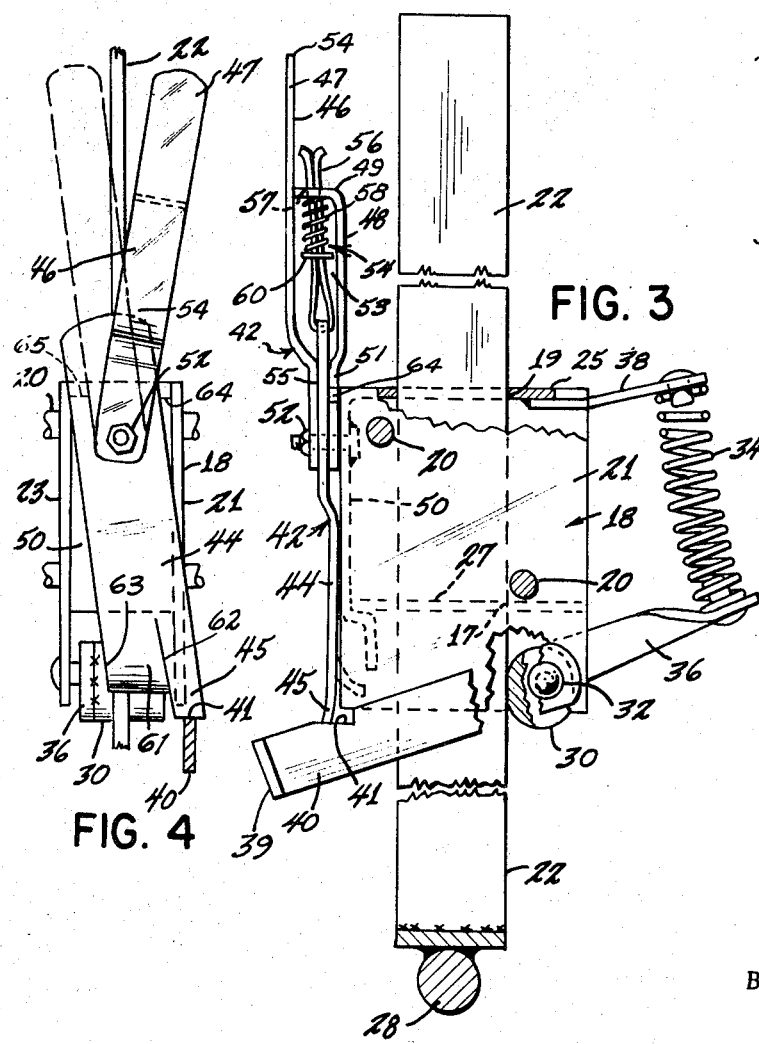
INVENTOR.
PAUL F. HASTINGS
BY
Alex. Lagaard
ATTORNEY

HANDLE HEIGHT ADJUSTMENT FOR CULTIVATORS

BACKGROUND OF THE INVENTION

The field of the invention is in garden cultivators in which the cultivator is propelled by the action of the tiller. In prior art cultivators, no simple, quick means to adjust the handle for maximum operator convenience and comfort has been provided.

SUMMARY OF THE INVENTION

The instant invention overcomes the problems arising with prior art cultivators by utilizing a wheel supported device that can be selectively adjusted relative to the tiller to vary the height at which the handle is positioned relative to the surface of the ground.

In the drawings:

FIG. 1 is a side view of a cultivator embodying one form of the invention.

FIG. 2 is a side view of a portion of the cultivator shown in FIG. 1 and drawn to a greater scale, and taken on line 2-2 of FIG. 1.

FIG. 3 is a side view of part of the structure shown in FIG. 2 and drawn to a still greater scale.

FIG. 4 is a rear elevational view of the structure shown in FIG. 3.

The instant invention is shown as used with a cultivator designated by the numeral 10 in FIG. 1. This cultivator includes a frame 11, handlebars 12 extending upwardly therefrom and having handles 13 mounted thereon. A gasoline engine 14 and a tiller 15 operated thereby are both mounted on the frame 11.

The cultivator 10 has mounted on it a handle height adjustment 16 which includes a case 18 having sides 21 and 23, a back 50, a top 25 and a bottom 27. This case is mounted on the frame 11 of the cultivator by means of bolts 20 and serves as a support for a wheel assembly 24. The wheel assembly 24 includes an upright 22 which is attached as by welding at its lower end to a shaft 28 on which is rotatably mounted a pair of ground engaging wheels 26.

The upright 22 extends through openings 17 and 19 in the top 25 and the bottom 27 of the case 18. The upright 22 is retained in adjusted position relative to the case 18 by means of a cam 30. This cam is eccentrically attached to and supported by a shaft 32 extending through and journaled by the sides 21 and 23 of the case 18. The cam 30 is urged into engagement with the upright 22 by a spring 34 positioned intermediate a spring arm 36 and a fixed bracket 38 attached to the top 25 of the case 18. The spring arm is fixedly secured to the cam 30 as by welding and thus action of the spring and movement of the arm 36 causes rotational movement of the cam against the upright 22. A foot operated release arm 40 is also fixedly secured as by welding to the shaft 32 outwardly of the side 21 of the case 18. Pressure of the spring 34 causes downward movement of the arm 40 at the end opposite the cam to cause the cam to engage the upright 22 and when downward pressure is urged on a pedal 39 formed on said arm the spring 34 is compressed and the upright 22 released.

For holding the arm 40 down, locking means 42 is employed which includes a locking lever 44. This lever is pivoted to the back 50 of case 18 by means of a bolt 52. The lower end of this lever has a pawl 45 which engages a shoulder 41 on arm and holds the arm 36 up with the spring 34 compressed and the upright 22 free to move.

For operating the lever 44 an over center device 54 is employed which includes an actuating arm 46. Overlying this arm is a companion arm 48 which is spaced from the arm 46 to provide a space 53 therebetween. For the purpose these arms are formed with offsets 51 and 55 and the upper end of the arm 48 is bent to form a transverse part 49 which extends up to and is welded to the arm 46. The lower ends of these offsets straddle the upper end of lever 44 and are journaled on the bolt 52, the head of which is welded to the back 50 of case 18.

The over center device 54 utilizes a cotter pin 56, the loop of which is pivoted to the upper end of the lever 44 and the shank of which is freely slidable in an opening 57 in the transverse part 49 of the arm 48. A compression coil spring 58 encircles the shank of cotter key 56 and is seated at end against one part 49 of arm 48 and at its other end against a washer 60 on the shank of the cotter key. The upper end of the arm 46 extends above the part 49 to form a handle 47 by means of which the lever 44 may be moved. The locking lever 44 is limited in movement by means of a finger 61 bent inwardly from said lever at the lower end of the same and which has edges 62 and 63 engageable with the walls 21 and 23 of the case 18 and which serve as stops for limiting the movement of said lever. The companion arm 46 is also limited in movement by two stops 64 and 65 extending outwardly from the back 50 of case 18 and engageable with the edges of said companion arm 48.

The method of operation is as follows: Normally the lever 44 is disposed with the pawl 45 out of engagement with shoulder 41 on arm 40 and the lever 44 swung over to the side 23 of the case 18. Spring 34 is now expanded and the cam 30 is urged against upright 22 to lock the case 18 from movement relative to upright 22. When it is desired to raise or lower the upright 22, the operator steps on pedal 39, lowering arm 40, thereby releasing cam 30 which frees upright 22. By maintaining pressure on pedal 39 the operator can raise or lower the handle 13, the wheel assembly 24 remaining on the ground and the upright 22 sliding in the case 18 while the case moves up and down. If it is desired to hold arm 40 down to permit of installing or removing upright 22, arm 46 is moved to the right, shifting lever 44 to the position shown in full lines in FIG. 4, bringing pawl 45 into engagement with the face of the lever 40. When the operator steps hard on the pedal 39 and pulls arm 46 to the right as shown in FIG. 4, lever 44 moves over to cause pawl 45 to engage shoulder 41 on lever 40, thereby holding said arm from movement when the foot is removed from the pedal 39. To clamp upright 22 in position the lever 40 is released by moving arm 46 into the dotted line position as shown in FIG. 4. Then by the operator stepping on pedal 39 the lever 44 is moved by spring 58 towards the side 23 of case 18 and the pawl 45 disengaged from the shoulder 41. Upon moving the foot of the operator off from the pedal 39 spring 34 expands and the upright 22 is locked in position.

The advantages of the invention are manifest. The height of the handle above the ground can be readily controlled. If desired the entire wheel assembly can be quickly installed or removed from the cultivator. The device is easy to operate and is simple in construction.

While this application discloses a preferred embodiment of the invention, changes to its specific form may be made without departing from the spirit of the invention.

I claim:

1. In a handle height adjustment for use with a power driven cultivator including a frame, a tiller and a handle extending rearwardly thereof, said handle height adjustment including a support attached to said frame, an upright, guide means carried by said support and guiding said upright for up and down movement, an axle attached to the upright at its lower end, a ground engaging wheel rotatably mounted on said axle, a shaft carried by said support and a cam carried by said shaft and engageable with said upright to hold the same in adjusted position, the combination of:
    a. a spring arm fixed relative to said cam;
    b. a bracket fixed relative to the support;
    c. a compression spring acting between said spring arm and bracket and urging said cam into engagement with said upright;
    d. release means compressing the coil spring to free said cam from said upright; and
    e. locking means for restraining actuation of said release means.

2. In a handle height adjustment for use with a power driven cultivator including a frame, a tiller, and a handle extending rearwardly thereof, said handle height adjustment including a support attached to said frame, an upright, guide means carried by said support and guiding said upright for up and down movement, an axle attached to the upright at its lower end, a ground engaging wheel rotatably mounted on said axle, a shaft carried by said support and a cam carried by said shaft and engageable with said upright to hold the same in adjusted position, the combination of:

a. resilient means acting between said cam and upright for restraining relative movement therebetween;

b. release means for releasing said cam from engagement with said upright and including;
c. a release arm fixed relative to the shaft; and
d. depressing the same acting to compress the spring and release the upright; and
e. locking means for restraining actuation of said release means.